(12) United States Patent
Bley et al.

(10) Patent No.: US 12,353,187 B2
(45) Date of Patent: Jul. 8, 2025

(54) METHOD FOR POSITIONING A LIMP, FLAT WORKPIECE AND POSITIONING APPARATUS

(71) Applicant: SEWTS GMBH, Munich (DE)

(72) Inventors: Alexander Bley, Munich (DE); Tim Doerks, Munich (DE); Till Rickert, Munich (DE)

(73) Assignee: SEWTS GMBH, Munich (DE)

( * ) Notice: Subject to any disclaimer, the term of this patent is extended or adjusted under 35 U.S.C. 154(b) by 554 days.

(21) Appl. No.: 17/624,529

(22) PCT Filed: Jul. 3, 2019

(86) PCT No.: PCT/EP2019/067891
§ 371 (c)(1),
(2) Date: Jan. 3, 2022

(87) PCT Pub. No.: WO2021/001039
PCT Pub. Date: Jan. 7, 2021

(65) Prior Publication Data
US 2022/0244699 A1    Aug. 4, 2022

(51) Int. Cl.
*G05B 19/402*    (2006.01)

(52) U.S. Cl.
CPC .. *G05B 19/402* (2013.01); *G05B 2219/50047* (2013.01)

(58) Field of Classification Search
CPC ........ G05B 19/402; G05B 2219/50047; G01N 2021/9518
See application file for complete search history.

(56) References Cited

U.S. PATENT DOCUMENTS

| 4,616,815 | A  | * | 10/1986 | Vijuk | ..................... B65H 31/36 |
| | | | | | 271/211 |
| 6,477,797 | B1 | | 11/2002 | Takahashi et al. | ..... D06F 67/04 |
| 9,909,252 | B2 | | 3/2018 | Bringewatt et al. | .... D06F 67/04 |
| 10,089,575 | B1 | * | 10/2018 | Redmon | .................. G06N 3/08 |

(Continued)

FOREIGN PATENT DOCUMENTS

| EP | 2113606 | 11/2009 | |
| EP | 3147405 | 4/2018 | ............. D06F 67/04 |

(Continued)

OTHER PUBLICATIONS

International Search Report and Written Opinion issued in PCT/EP2019/067891, dated Mar, 26, 2020, with English translation, 23 pages.

(Continued)

*Primary Examiner* — Chad G Erdman
(74) *Attorney, Agent, or Firm* — HAYES SOLOWAY P.C.

(57) ABSTRACT

Disclosed is a method of positioning a limp flat workpiece is described, wherein the flat workpiece is provided in a random state on a manipulation surface. Subsequently, a camera image showing the flat workpiece is generated, and a grippable edge of the flat workpiece is identified by extracting characteristic image features of the camera image. Thereafter, a first gripping point for a first gripper and a second gripping point for a second gripper are determined, the second gripping point being spaced apart from the first gripping point. Also disclosed is positioning device for positioning a limp flat workpiece is presented.

20 Claims, 6 Drawing Sheets

(56) References Cited

U.S. PATENT DOCUMENTS

| | | | |
|---|---|---|---|
| 10,633,198 B2 | 4/2020 | Bringewatt et al. | .... B65G 47/90 |
| 11,185,980 B2* | 11/2021 | Huang | .............. B25J 9/1679 |
| 11,845,191 B1* | 12/2023 | Kuzhinjedathu | ...... B25J 9/1679 |
| 2006/0191171 A1 | 8/2006 | Jensen et al. | ........... D06F 67/04 |
| 2009/0266749 A1 | 10/2009 | Heinz et al. | |
| 2015/0292142 A1 | 10/2015 | Tautz et al. | |
| 2018/0347104 A1 | 12/2018 | McCabe | ................ D06F 95/00 |
| 2019/0184570 A1* | 6/2019 | Yung | .................. B25J 9/163 |
| 2019/0228495 A1* | 7/2019 | Tremblay | ............... G05B 13/00 |
| 2019/0345664 A1 | 11/2019 | Bringewatt et al. | .... D06F 67/04 |
| 2020/0224348 A1 | 7/2020 | Yano | ........................ D06C 3/02 |
| 2020/0384640 A1* | 12/2020 | Yonekura | ............... B25J 19/023 |

FOREIGN PATENT DOCUMENTS

| | | | |
|---|---|---|---|
| EP | 3421659 | 1/2019 | ............. D06F 95/00 |
| EP | 3 499 463 | 6/2019 | ............... G06T 7/73 |
| EP | 2930264 | 11/2023 | |
| JP | 2008020321 A * | 1/2008 | |
| JP | 2010000561 | 1/2010 | ............. B25J 15/08 |
| JP | 2010273732 | 12/2010 | |
| JP | 2014045801 | 3/2014 | ............. D06F 67/04 |
| JP | 2014045801 A * | 3/2014 | |
| WO | WO2017207083 | 12/2017 | ............. D06F 67/04 |
| WO | WO2018130418 | 7/2018 | ............. D06F 67/04 |
| WO | WO2019044191 | 3/2019 | ............... D06C 3/00 |
| WO | WO2020/067413 | 4/2020 | ............. D06F 89/00 |

OTHER PUBLICATIONS

International Preliminary Report on Patentability issued in PCT/EP2019/067891, dated Dec. 28, 2021, 10 pages.

Maitin-Shepard, et al., "Cloth Grasp Point Detection based on Multiple-View Geometric Cues with Application to Robotic Towel Folding" *IEEE International Conference on Robotics and Automation: ICRA 2010*: Anchorage AK, May 3-8, 2010, 8 pages.

Paraschidic et al. "A robotic system for handling textile and non rigid flat materials" *Computers in Industry*, vol. 26, Issue 3, Aug. 1995, pp. 303-313, abstract only, 2 pages.

Ho et al., "Analysis of Sliding of a Soft Fingertip Embedded with a Novel Micro Force/Moment Sensor: Simulation, Experiment, and Application", IEEE International Conference on Robotics and Automation, Kobe, Japan, 2009, pp. 889-894.

Shibata, et al., "Handling of Memmed Fabrics by a Single-Armed Robot", 4th IEEE Conference on Automation Science and Engineering, Washington DC, 2008, pp. 882-887.

Shibata et al., "A Pinching Strategy for Fabrics Using Wiping Deformation", Department of Robotics, Kindai University, 2016, 15 pages.

Yuba, et al., "Unfolding of a Rectangular Cloth Based on Action Selection Depending on Recognition Uncertainty", IEEE/SICE International Symposium on System Integration, Japan, 2015, pp. 623-628.

Yuba et al., "Unfolding of a rectangular cloth from unarranged starting shapes by a Dual-Armed robot with a mechanism for managing recognition error and uncertainty", Advanced Robotics, 2017, 14 pgs.

International Search Report issued in PCT/EP2021/079128, with translation, dated Jan. 24, 2022, 5 pgs.

International Preliminary Report on Patentability issued in PCT/EP2021/079128, dated Apr. 13, 2023, with English translation of Written Opinion, 15 pages.

ImageNet, https://www.image-net.org/index.php, accessed Jul. 10, 2023, 1 pg.

He et al., "Deep Residual Learning for Image Recognition", 2016 IEEE Conference on Computer Vision and Pattern Recognition, 9 pgs.

U.S. Appl. No. 18/033,267, filed Apr. 21, 2023, Bley et al.

Hata et al., "Vision System and Flexible Robot Hand for Cloth Handling Robot System", Int. Conference on Control, Automation and System 2008, Oct. 14-17, 2008, 6 pgs.

Kobayashi et al., "A Study on Handling System for Cloth Using 3-D Vision Sensor", IEEE 34th Annual Conference, 2008, 6 pgs.

"Robotic Laundry Handling System: DigInfo", YouTube, https://www.youtube.com/watch?v=s1X_1OfUAnE, accessed Nov. 13, 2024, 2 pgs.

Opposition filed in EP 3993958, dated Aug. 29, 2024, 20 pgs.

\* cited by examiner

METHOD FOR POSITIONING A LIMP, FLAT WORKPIECE AND POSITIONING APPARATUS

BACKGROUND OF THE INVENTION

The invention relates to a method of positioning a limp flat workpiece. The invention further relates to a positioning device for positioning a limp flat workpiece.

In this context, a flat workpiece is understood to mean a workpiece that can assume a planar or sheet-like shape, i.e., for example, that has the form of a mat or a sheet or film. Such a workpiece is therefore significantly smaller in one of its dimensions than in the other two dimensions.

In this connection, limp workpieces are workpieces in which large deformations can be obtained by the action of comparatively small forces and/or moments. Limp workpieces thus have a low modulus of elasticity. They are also referred to as dimensionally instable or dimensionally unstable.

Limp flat workpieces are found in numerous fields of industrial application. Examples include the manufacture of textiles, in particular garment textiles, industrial laundries, the production of covers and linings for vehicles and aircraft, and the manufacture of components made from fiber composites.

In the fields of application mentioned, a common problem here is that the limp flat workpieces have to be transferred from a random, in particular randomly or irregularly folded state to a defined position in order to be machined or machine-processed, for example. In most cases, this involves bringing the limp flat workpiece into a flat, spread-out position.

In many of the fields of application mentioned, it is common practice to transfer the flat workpieces to such a defined position manually.

Automated solutions for this are also known. These are usually based on the functional principle of multiple regripping. This means that the flat workpiece is gripped several times at different points until it can be transferred to the defined position.

SUMMARY OF THE INVENTION

Against this background, it is the object of the invention to indicate an improved method of the kind mentioned at the outset and an improved positioning device of the kind mentioned at the outset. In particular, it is intended to achieve that a flat workpiece can be transferred to the desired final state in a simple, fast and reliable manner, irrespective of its random initial state.

The object is achieved by a method of the kind mentioned at the outset, wherein a positioning device is provided which includes at least one control unit, a camera, at least one first gripper and at least one second gripper. The method includes the steps of:
a) providing the flat workpiece in a random, in particular folded, state on a manipulation surface;
b) generating, by the camera, a camera image showing the flat workpiece;
c) identifying, by a first machine learning module of the control unit, a grippable edge of the flat workpiece by extracting characteristic image features of the camera image;
d) determining, by a second machine learning module of the control unit, a first gripping point for the first gripper at the grippable edge; and
e) determining, by the second machine learning module of the control unit, a second gripping point for the second gripper at the grippable edge, the second gripping point being spaced apart from the first gripping point.

The randomly folded state may also be referred to colloquially as wadded or crumpled. In the case of application in a textile laundry, a textile product is thus provided in the condition in which it is at the end of a washing or drying process without further measures. By using the camera in conjunction with the first machine learning module, the method can be applied to a wide range of flat workpieces. In addition, it is possible to adapt the method to any new flat workpieces. It is therefore universally applicable. Furthermore, a comparatively wide range of random states of the flat workpiece can be processed. The method therefore operates particularly efficiently and effectively. The second machine learning module is used to determine the gripping points.

Moreover, the method according to the invention is simple and can proceed in an automated manner. This applies in particular in comparison to manual processes and to the mechanical processes initially mentioned, in which the flat workpiece has to be gripped several times.

In this context, a grippable edge is understood to mean an edge of the flat workpiece that can be grasped by means of a gripper. Here, edges are outer edges of the flat workpiece and may, e.g., be provided with a hem or border.

Preferably, for determining the gripping points, first the coordinates of the grippable edge identified are calculated and the gripping points are determined on this basis.

In addition, a method step may be provided according to which the flat workpiece is removed from the manipulation surface if no grippable edge can be identified. The flat workpiece can then either be further processed separately and/or made available on the manipulation surface again.

Furthermore, provision may be made for a computer program having program code means, which receives the camera image and may be used to carry out steps c) to e) of the method according to the invention when the computer program is executed on a computer or an appropriate processing unit, in particular on a processing unit of a control unit. Here, the control unit preferably is a control unit of a positioning device. Such a computer program allows flat workpieces that are provided in a random state to be transferred to a defined position.

Moreover, a computer-readable data carrier may be provided which has such a computer program stored thereon. In this connection, the computer program may also be stored on a server, which is, for example, a cloud server.

Furthermore, the flat workpiece may be gripped in an automated manner by means of the first gripper and the second gripper, the first gripper gripping at the first gripping point and the second gripper gripping at the second gripping point. To this end, use is made of the gripping points described above. The gripping process creates the prerequisite for transferring the flat workpiece to a desired position. In this context, this is also referred to as manipulation of the flat workpiece.

In addition, preferably the flat workpiece is held by means of the second gripper and the first gripper is moved along the gripped edge until the first gripper grips a first corner of the flat workpiece, and/or the flat workpiece is held by means of the first gripper and the second gripper is moved along the gripped edge until the second gripper grips a second corner of the flat workpiece. In a preferred final state, the flat workpiece is thus held by means of the two grippers at one corner each, which define a common edge. This is also referred to as drawing up or uptake of the flat workpiece. Starting from this state and the associated gripper positions, the flat workpiece can be quickly and easily transferred to a desired state.

Advantageously, for moving along with the first gripper, a gripping force of the first gripper is reduced in comparison to a gripping force of the second gripper, or the first gripper is opened by a specified amount. The specified amount here is, for example, a particular distance or a particular angle. This allows the first gripper to slidingly move along the gripped edge. The flat workpiece continues to be held by the first gripper despite this relative movement. Any regripping or change of grip in the classical sense does not occur. Therefore, this process can proceed quickly.

For moving along with the second gripper, a gripping force of the second gripper may also be reduced in comparison to a gripping force of the first gripper, or the second gripper may be opened by a specified amount. The effects and advantages already mentioned with respect to the first gripper are analogously applicable to the second gripper.

In the event that the first gripper was previously moved along the edge, the gripping force of the first gripper is preferably increased again before the second gripper is moved along the edge.

Furthermore, the flat workpiece can be deposited in a flat condition by means of the first gripper and the second gripper. A surface-to-surface depositing may be performed on a flat or a curved surface here.

According to a variant embodiment, using the two grippers, the flat workpiece is placed in a machine that serves for further processing thereof. In this connection, the flat workpiece may be placed on a roll or a conveyor belt, for example. In the event that the flat workpiece is a textile, a further processing machine may be a folding machine or a mangling machine. The flat workpiece is thus deposited with surface contact reliably and with high precision.

It is irrelevant for the method according to the invention whether the flat workpiece is wet or dry.

According to one embodiment, prior to generating the camera image, an area of contact of the flat workpiece with the manipulation surface is enlarged starting from the random state, in particular by moving the flat workpiece relative to an airflow. In other words, in relation to the random state the flat workpiece is spread out on the manipulation surface. It is not important here that the spreading is complete or perfect. Rather, this method step is based on the finding that by means of an enlarged contact surface of the flat workpiece, the associated grippability, i.e. the probability that a grippable edge is available, can also be increased. In this way, the amount of random initial states proceeding from which a grippable edge can be identified is further increased. This increases the reliability of the method.

Since moving the flat workpiece by means of the grippers is also referred to as manipulation, the enlarging of the contact surface that takes place before can also be referred to as pre-manipulation.

According to a preferred embodiment, the relative movement between the flat workpiece and the airflow takes place in that the flat workpiece is dropped against the airflow. This means that an airflow directed essentially from the bottom to the top is provided and the flat workpiece is dropped. This is particularly simple, since the flat workpiece does not need to be actively moved.

In this context, it is also conceivable that an enlargement of the contact surface, i.e. a pre-manipulation, only takes place if required. For example, this method step is only carried out if no grippable edge could be ascertained.

Prior to identifying the grippable edge, it is also possible to identify a type of the flat workpiece by means of a third machine learning module of the control unit, in particular wherein the type of the flat workpiece is identified from a plurality of predefined types. If the type of flat workpiece is known, all subsequent method steps can be geared towards this particular type. This applies in particular to the handling of the flat workpiece by means of the grippers. The subsequent steps can therefore be carried out with increased speed and reliability. For the application case of a large-scale laundry, the predefined types may comprise, for example, small towels, large towels, pillows, napkins and tablecloths.

In an alternative, it is also possible to utilize the identification of the type of flat workpiece merely to distinguish processable flat workpieces from non-processable flat workpieces. When a non-processable type of flat workpiece is detected, the associated flat workpiece is removed from the manipulation surface or the process is otherwise aborted or canceled.

The underlying camera image is preferably a color image. This allows the accuracy of the identification of the type of flat workpiece to be increased.

Advantageously, the camera image is a two-dimensional image. Such images can be generated using cameras that are commercially available at low cost.

The camera image may have a resolution of 2456 pixels by 2054 pixels. This constitutes a good tradeoff between a reliable identification of the correct type, for which as high a resolution of the image as possible has to be chosen, and a small file size of the camera image, which is useful for fast processing.

The third machine learning module preferably includes a trained artificial neural network that receives the camera image or partial images of the camera image for extracting characteristic image features. The artificial neural network allows the characteristic image features to be extracted and thus the type of flat workpiece involved to be determined with high accuracy and speed.

As already mentioned, a color image having a resolution of 2456 pixels by 2054 pixels may be used. Optionally, it may be reduced to a size of 224 pixels by 224 pixels in order to further reduce the computational complexity.

The artificial neural network is made use of for classifying the image features. For example, using the artificial neural network, for each predefined type a probability can be established with which a given image belongs to this type. The type to which the flat workpiece belongs with the highest probability then constitutes the type of flat workpiece identified.

The artificial neural network comprises 18 layers, for example.

In one variant, the first machine learning module includes a trained artificial neural network that receives the camera image or partial images of the camera image for extracting characteristic image features. Thus, the first machine learning module may also be referred to as an image processing unit. Extracting the characteristic image features using such a machine learning module is performed quickly and reliably.

For identifying the grippable edge, in one alternative, the camera image is subdivided into a plurality of partial images, in particular by the control unit, and characteristic image features are extracted by the first machine learning module of the control unit for each partial image.

Based on the characteristic image features, for each partial image a probability is established with which it shows an edge of the flat workpiece, in particular wherein, for each partial image, probabilities are established with which it belongs to one of a plurality of predefined categories. In this way, a grippable edge can be identified quickly and reliably.

For the application in a textile laundry, in this connection the following categories can be used: "no edge", "grippable edge", "ungrippable edge". This means that for each partial image the probabilities are established with which it belongs to the above-mentioned categories. A grippable edge is considered to have been identified if the partial image belongs to the "grippable edge" category with the relatively highest probability.

This artificial neural network comprises, for example, between 10 and 180 layers. Particularly advantageous here are 34, 56 or 152 layers.

Preferably, the first gripping point and the second gripping point are determined in a section of the flat workpiece for the imaging of which in the camera image or in an associated partial image the relatively highest probability with which the camera image or the partial image shows an edge has been established by means of the first machine learning module.

Provision may also be made that the second machine learning module includes a trained artificial neural network which, for determining the first gripping point and the second gripping point, receives the camera image or at least one partial image of the camera image and extracts characteristic image features of the camera image or of the at least one partial image. Based on the characteristic image features, gripping coordinates and a gripping orientation are calculated for the first gripper, and/or gripping coordinates and a gripping orientation are calculated for the second gripper. In doing so, the gripping point is first calculated in image coordinates and is then transformed into the machine coordinates associated with the respective grippers.

All of the artificial neural networks described above are trained, for example, with freely available datasets in which images or partial images have been annotated in accordance with the task of the artificial neural network. In particular, a dataset of the ImageNet project of Stanford and Princeton University (available at www.image-net.org) may be used for this purpose. Alternatively or additionally, it is possible to train the neural networks with, for example, 1000 to 5000 images per class, that is, per type or category to be recognized.

In this connection, all of the artificial neural networks may be convolutional neural networks. A convolutional neural network is particularly well suited for the tasks described above. Here, the architecture of the artificial neural networks is based on the architecture described in the article "Deep Residual Learning for Image Recognition" by K. He, X. Zhang, S. Ren and J. Sun, which was published in the context of the 2016 IEEE Conference on Computer Vision and Pattern Recognition. Here, the last layer of the artificial neural network was always adapted to the respective specific task.

Furthermore, the object is achieved by a positioning device of the type initially mentioned, including a manipulation surface on which the flat workpiece can be provided, a camera that is configured to generate an image of the flat workpiece present on the manipulation surface, a first manipulator carrying a first gripper, and a second manipulator carrying a second gripper, the first gripper and the second gripper being configured to each grip at least a portion of the flat workpiece provided on the manipulation surface. By means of a device of this type, a flat workpiece can be quickly and easily transferred from a random state to a desired final state. Since the random state of the flat workpiece is detected by means of the camera, time-consuming regripping operations may be dispensed with and the grippers can interact directly with the flat workpiece at suitable locations.

Preferably, the device comprises a control unit which includes a first machine learning module having a trained artificial neural network which is configured to identify a grippable edge of the flat workpiece, and/or a second machine learning module having a trained artificial neural network which is configured to determine a first gripping point for the first gripper and a second gripping point for the second gripper on the grippable edge, and/or a third machine learning module having a trained artificial neural network which is configured to identify a type of the flat workpiece. This allows flat workpieces to be transferred to a desired state quickly and reliably.

In this context, the control unit and the camera may be configured to carry out a method according to the invention. The effects and advantages already mentioned can thus be achieved with the device according to the invention.

In addition, in one variant, provision is made for a drop distance for the flat workpiece and a ventilation unit which comprises a plurality of outflow openings and delimits the drop distance at least in sections. In this way, the flat workpiece can be moved relative to an airflow generated by the ventilation unit, and thus the contact surface of the flat workpiece can be purposefully increased in order to improve the grippability thereof. In this regard, the drop distance is oriented substantially vertically so that the flat workpiece can be moved along the drop distance solely by utilizing the force of gravity.

In this connection, the drop distance and the ventilation unit may be embodied as a module which, owing to its effect on the flat workpiece, may be referred to as a module for enlarging a contact surface of a flat workpiece.

Alternatively or additionally, the plurality of outflow openings is provided at a ventilation surface. For example, the ventilation surface extends substantially horizontally and coincides with the manipulation surface. This means that the flat workpiece can perform a movement relative to the airflow in the course of its placement on the manipulation surface, and in this way its contact surface on the manipulation surface can be increased. As an alternative, the flat workpiece may also be acted upon by an airflow when it has already come to rest on the manipulation surface. In both alternatives, a good grippability of the flat workpiece can be ensured in this way.

In a further embodiment, the plurality of outflow openings is provided at a ventilation surface that is inclined at an angle of less than 90 degrees in relation to a horizontal plane, and the manipulation surface adjoins a lower edge of the ventilation surface. Here, provision may be made that the flat workpiece slides over the ventilation surface and onto the manipulation surface after it has moved relative to the airflow. The ventilation surface thus constitutes a kind of slide. This is another way of ensuring that the flat workpiece can be gripped well.

In order to increase the accuracy in image acquisition by the camera, an optical marker may additionally be provided on one of the other components of the device, for example on the manipulation surface. Such a marker serves to compensate for inaccuracies in the conversion of coordinates in an image into coordinates of the device.

BRIEF DESCRIPTION OF THE DRAWINGS

The invention will be described below by reference to various exemplary embodiments that are shown in the accompanying drawings, in which:

FIGS. 1 and 2 show a positioning device 6 for positioning a limp flat workpiece 8.

DETAILED DESCRIPTION OF THE INVENTION

Figure 1:
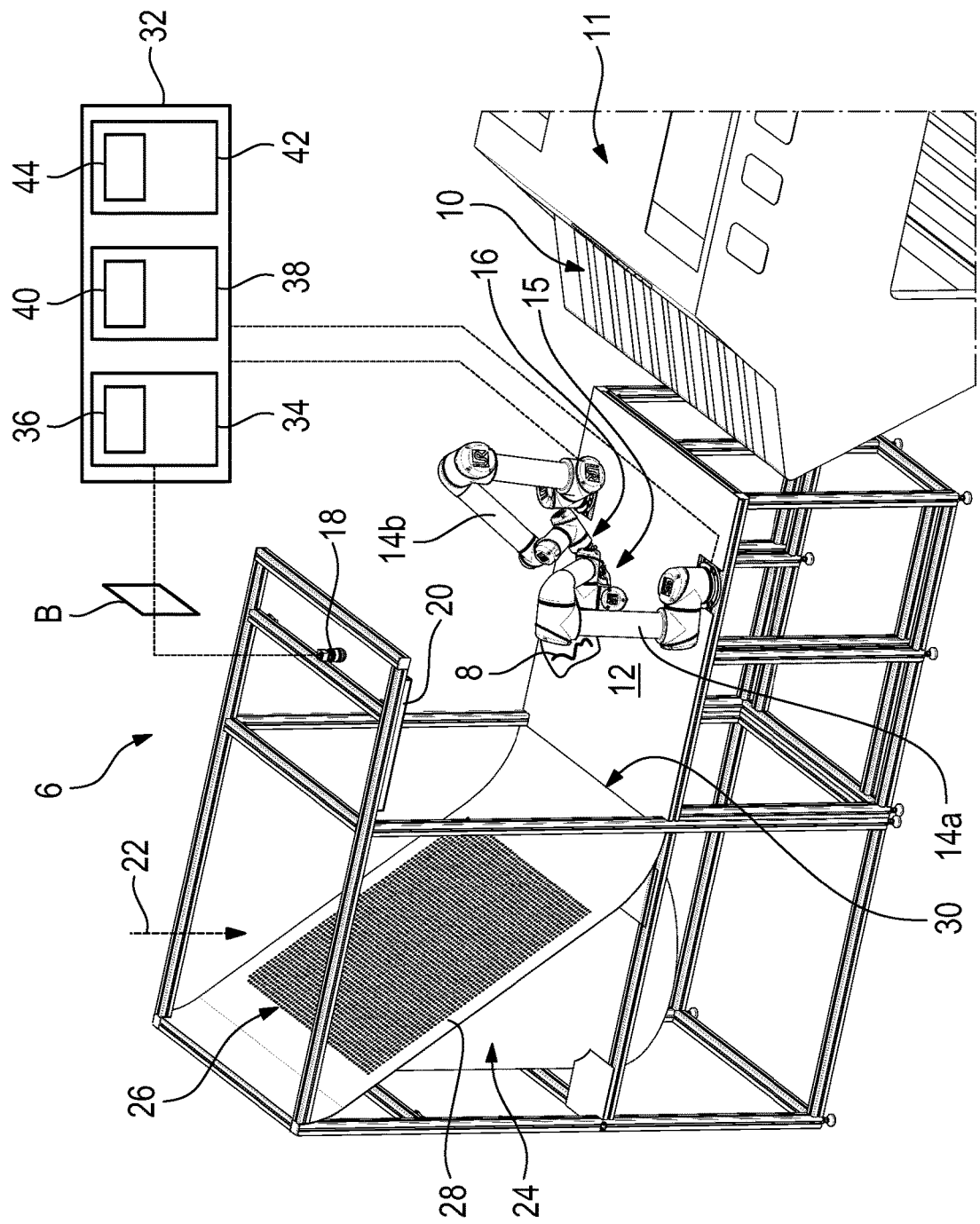
FIG. 1 shows a perspective illustration of a positioning device according to the invention, by means of which a method according to the invention can be carried out, with a further processing machine being additionally shown.

In the exemplary embodiment shown, the positioning device 6 serves to place the flat workpiece 8 onto and in full surface contact with a feed surface 10 of a further processing machine 11, which is only shown in sections.

The limp, flat workpiece 8 here is a piece of laundry, more precisely a flat piece of laundry, which has already gone through a laundering process and a drying process. The further processing machine 11 is, for example, a folding machine.

To this end, the positioning device 6 comprises a manipulation surface 12, on which the flat workpiece 8 can be provided, and a first manipulator 14a having a first gripper 15 and a second manipulator 14b having a second gripper 16.

Here, both grippers 15, 16 are configured to each grip at least a portion of the flat workpiece 8 made available on the manipulation surface 12.

In the illustrated embodiment, the manipulators 14a, 14b are positioned and secured on the manipulation surface 12.

In the present case, the manipulators 14a, 14b used are industrial robots.

Figure 3:
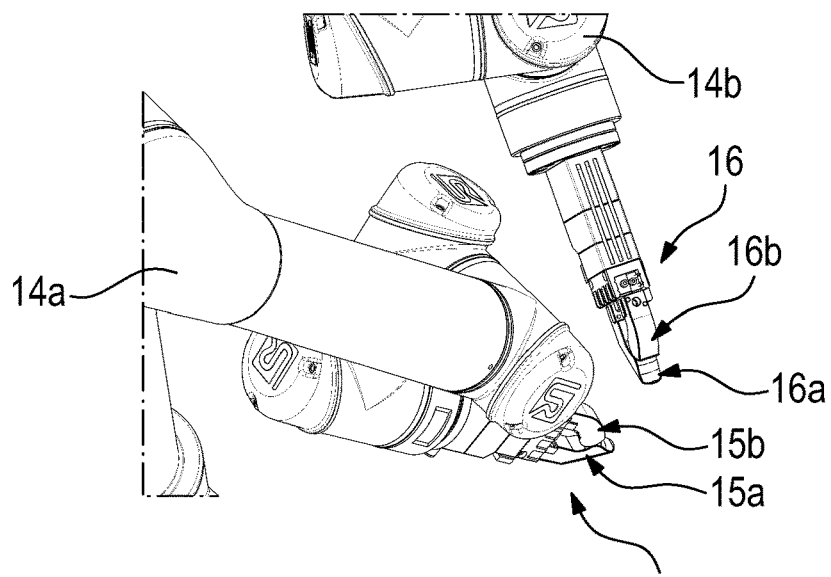
FIG. 3 shows a perspective illustration of a detail of the positioning device from FIGS. 1 and 2.

The grippers 15, 16 are illustrated in detail in FIG. 3 and each include a pair of fingers 15a, 15b, 16a, 16b, the respective lower fingers 15a, 16a being provided with a so-called single ball and the respective upper fingers 15b, 16b being provided with a double ball. The gripping surfaces provided by the lower fingers 15a, 16a thus comprise a spherical surface section. The gripping surfaces provided by the upper fingers 15b, 16b each comprise two spherical surface sections arranged next to each other. In the closed state of the grippers 15, 16, the spherical surface section of the respective lower finger 15a, 16a engages in the space between the two spherical surface sections of the associated upper finger 15b, 16b.

Of course, it is also possible here to equip the respective upper fingers with a single ball and the respective lower fingers with a double ball.

Furthermore, a camera 18 is provided which is designed to generate a camera image B of the flat workpiece 8 that lies on the manipulation surface 12.

In addition, the manipulation surface 12 may be illuminated by means of an illumination unit 20.

Figure 2:
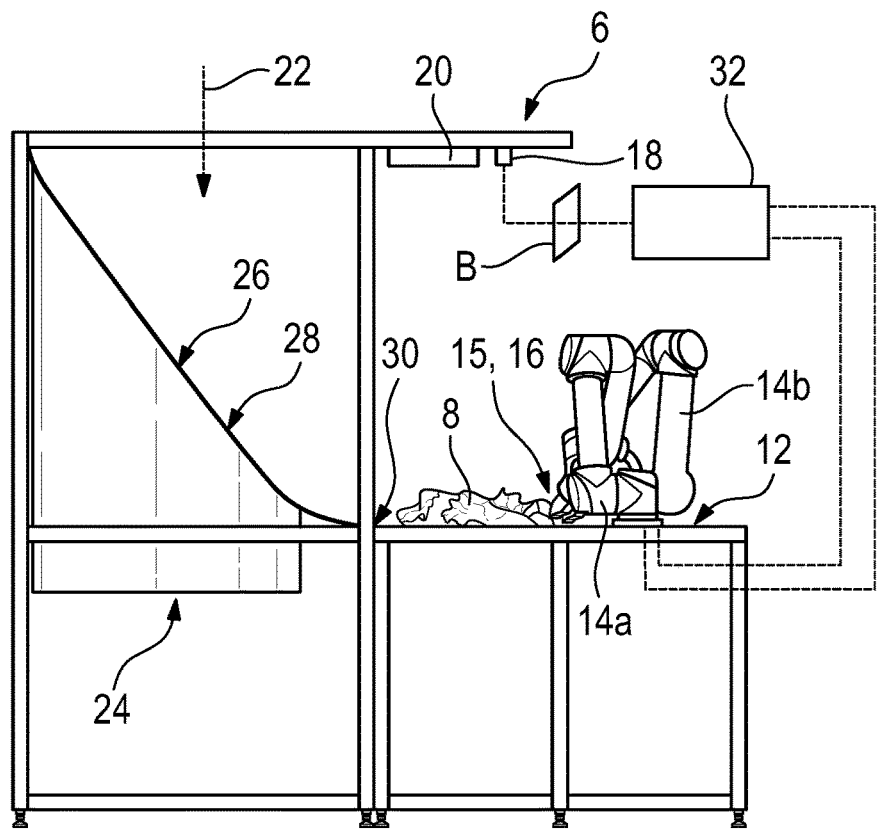
FIG. 2 shows a side view of the positioning device from FIG. 1.

Furthermore, a drop distance 22 for the flat workpiece 8 is provided within the positioning device 6, which is symbolized by a dashed arrow in FIGS. 1 and 2. In the vertical direction at the bottom, the drop distance 22 is bounded by a ventilation unit 24, which includes a plurality of outflow openings 26, all of which are arranged on a ventilation surface 28.

In the embodiment illustrated in FIGS. 1 and 2, the ventilation surface 28 is inclined by 45 degrees to 60 degrees, in particular by about 50 degrees, in relation to a horizontal plane. The ventilation surface 28 continues at its lower edge 30 into the manipulation surface 12. In other words, the manipulation surface 12 adjoins the lower edge 30 of the ventilation surface 28.

Figure 4:
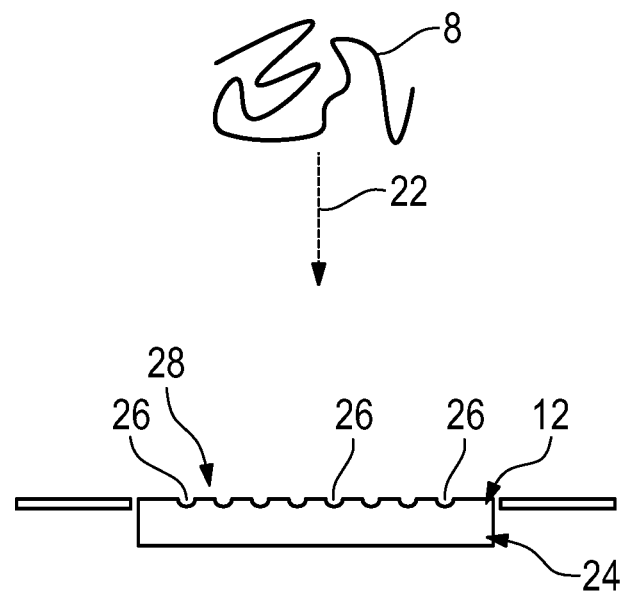
FIG. 4 shows a schematic illustration of an alternative embodiment of a ventilation surface of the positioning device according to the invention in a first operating state.
Figure 5:
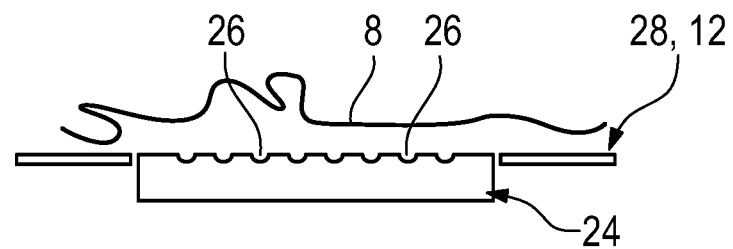
FIG. 5 shows a schematic illustration of the ventilation surface from FIG. 4 in a second operating state.
Figure 6:
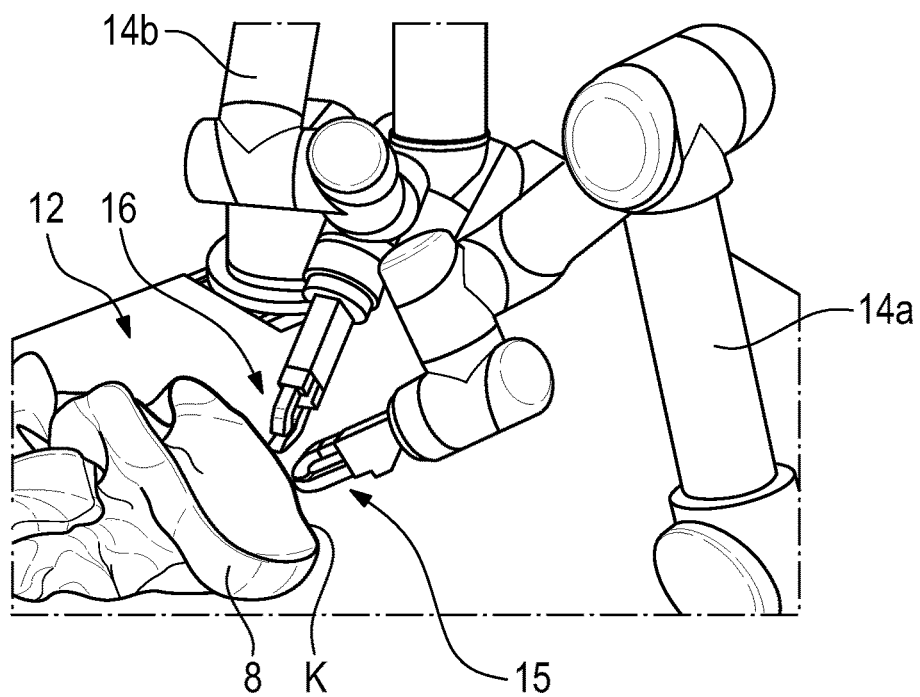
FIG. 6 and FIG. 7 show perspective detailed views of the positioning device according to the invention from FIGS. 1 and 2.

An alternative embodiment of the ventilation surface 28 can be seen in FIGS. 4 and 5. Here, the ventilation surface 28 extends substantially horizontally and coincides with the manipulation surface 12.

The positioning device 6 also comprises a control unit 32, which, on the one hand, is connected to the camera 18 in terms of signaling and, on the other hand, is coupled to the manipulators 14a, 14b and the grippers 15, 16 in terms of signaling.

The control unit 32 includes a total of three machine learning modules, with a first machine learning module 34 comprising an artificial neural network 36 which is configured to ascertain a grippable edge K of the flat workpiece 8 (see FIGS. 6 to 13).

A second machine learning module 38 also includes an artificial neural network 40 which is configured to determine a first gripping point on the grippable edge K for the first gripper 15 and a second gripping point on the grippable edge K for the second gripper 16.

A third machine learning module 42 also comprises an artificial neural network 44 that is configured to identify a type of the flat workpiece 8.

Here, all artificial neural networks 36, 40, 44 have already been trained. The training is performed on the basis of images or partial images that have been annotated in accordance with the task of the respective artificial neural network 36, 40, 44.

Such a positioning device 6 can be used to carry out a method for positioning the limp flat workpiece 8.

Figure 7:
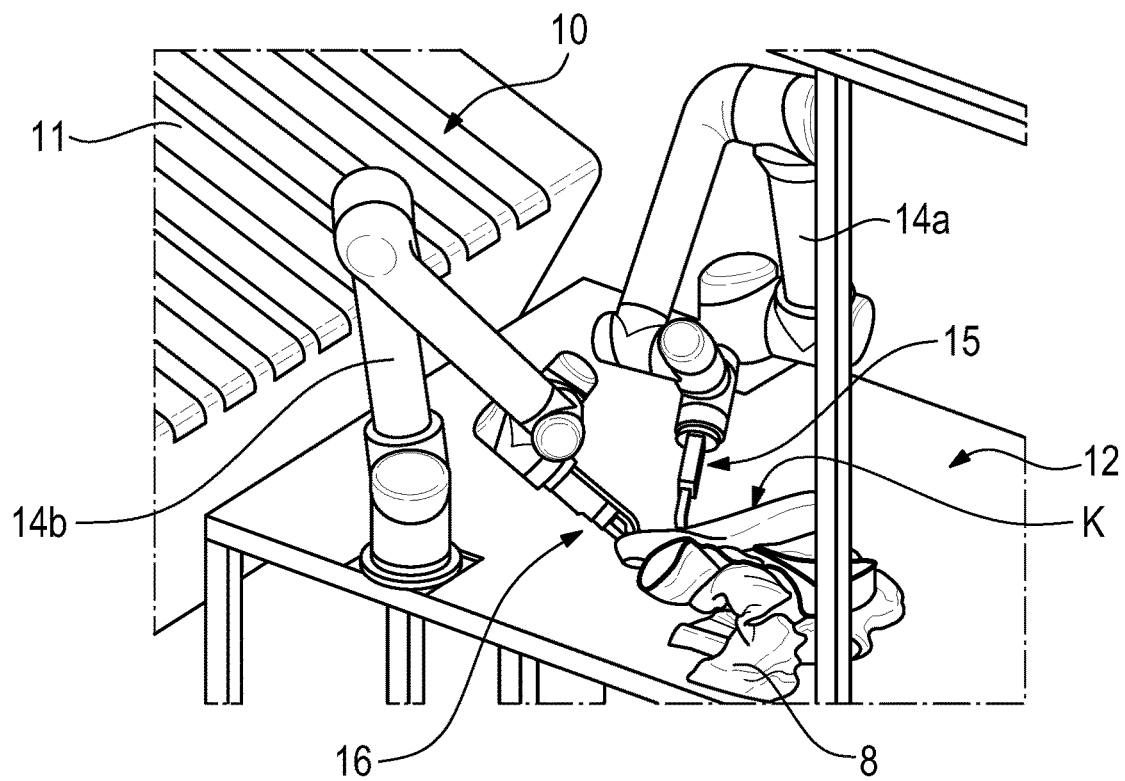

In the present example, the aim of this method is to place the flat workpiece 8, starting from a random state, in a defined and planar manner onto the feed surface 10 of the further processing machine 11 (see FIGS. 1 and 7).

To this end, the flat workpiece 8 is introduced into the positioning device 6 via the drop distance 22, while air flows from the outflow openings 26 and towards the flat workpiece 8. The flat workpiece 8 is thus dropped onto the ventilation surface 28 against the airflow thus generated, and then slides over the edge 30 and onto the manipulation surface 12 owing to the inclined position of the ventilation surface 28 (see FIG. 1).

In the event that the ventilation surface 28 is designed according to the embodiment of FIGS. 4 and 5, the ventilation surface 28 coincides with the manipulation surface 12.

The flat workpiece 8 is then dropped directly onto the manipulation surface 12 against the airflow.

Thus, in both alternatives, the flat workpiece 8 is provided on the manipulation surface 12.

Here, both the state of the flat workpiece 8 in which it is introduced into the drop distance 22 and the state in which the flat workpiece 8 comes to rest on the manipulation surface is a random one.

However, the movement of the flat workpiece 8 relative to the airflow causes its area of contact with the manipulation surface 12 to be increased, which facilitates the method steps described below.

Subsequently, a camera image B showing the flat workpiece 8 is generated by means of the camera 18. This image is a two-dimensional color image with a resolution of 2456 pixels by 2054 pixels.

This camera image B is received by the third machine learning module 42, more precisely by the associated artificial neural network 44. In order to keep the computational effort in the artificial neural network 44 low, the camera image B may be reduced beforehand to a resolution of 224 pixels by 224 pixels.

The artificial neural network 44 serves to identify a type of flat workpiece 8, for which purpose characteristic image features of the camera image B are identified by means of the artificial neural network 44.

In the embodiment illustrated, in this connection a certain number of predefined types are stored on the control unit 32. By means of the artificial neural network 44, probabilities are calculated which comprise, for each predefined type, a value for the probability with which the flat workpiece 8 in the camera image B belongs to this type.

Since in the present case the flat workpiece 8 involved is a flat piece of laundry, the predefined types are, e.g., small towel, large towel, pillowcase, napkin and tablecloth.

The third machine learning module 42 assigns to the flat workpiece 8 the type for which the highest probability value has been established.

Such a type determination serves two purposes.

For one thing, flat workpieces 8 that do not match any of the predefined types may be removed from the manipulation surface 12. Such flat workpieces 8 are thus not treated further. Alternatively, the process may be cancelled or aborted if the flat workpiece 8 does not match any of the predefined types. For this purpose, a minimum value for the probability values assigned to the predefined types may be fixed.

For another thing, the type as detected of the flat workpiece 8 may be used to set the operation of the grippers 15, 16 specifically for this type. For example, gripping forces may be configured depending on the type.

Further, the camera image B is partitioned by the control unit 32 into partial images which, in the example shown, each have a size of 224 pixels by 224 pixels and either overlap only slightly or are extracted from the camera image B without overlapping. A so-called sliding window approach is used for this purpose.

These partial images are received by the first machine learning module 34, more precisely by the associated artificial neural network 36, which is used to ascertain the grippable edge K of the flat workpiece 8.

By means of the artificial neural network 36, characteristic image features are extracted for each partial image for this purpose, and for each of the partial images a value of the probability is determined with which it shows an edge of the flat workpiece.

In this connection, too, predefined categories are again used and, by means of the artificial neural network 36 and on the basis of the characteristic image features, for each partial image probability values are established with which it belongs to these categories. In the exemplary embodiment illustrated, the categories are "no edge", "grippable edge", "ungrippable edge". The category "grippable edge" here also includes the case in which the partial image shows a corner.

The first machine learning module 34 then selects that partial image which shows an edge with the highest probability value, i.e. which belongs, with the highest probability value, to the "grippable edge" category.

This partial image is received by the second machine learning module 38, more precisely by the associated artificial neural network 40, which serves to determine gripping points for the first gripper 15 and the second gripper 16.

This means that the first gripping point and the second gripping point are fixed in a section of the flat workpiece 8 for the imaging of which in the associated partial image the relatively highest value of probability that this imaging shows an edge has been determined by means of the first machine learning module 34.

By means of the artificial neural network 40, characteristic image features of the partial image are again extracted. On this basis, gripping coordinates and a gripping orientation are calculated for each of the first gripper 15 and the second gripper 16.

These are first ascertained in image coordinates in the partial image and then converted to machine coordinates of the manipulators 14a, 14b and the grippers 15, 16.

Since the flat workpiece 8 is always gripped at a specified height above the manipulation surface 12, it is sufficient in the present case to ascertain the gripping coordinates and the gripping orientations in two dimensions by means of the artificial neural network 40.

Here, the second gripping point for the second gripper 16 is always located spaced apart from the first gripping point for the first gripper 15.

The flat workpiece 8 is now gripped in an automated fashion by means of the two grippers 15, 16 at the specified gripping points. For this purpose, the grippers 15, 16 are controlled by the control unit 32. Both grippers 15, 16 utilize a predefined gripping force of essentially the same magnitude, which may depend on the type of flat workpiece 8.

Figure 8:
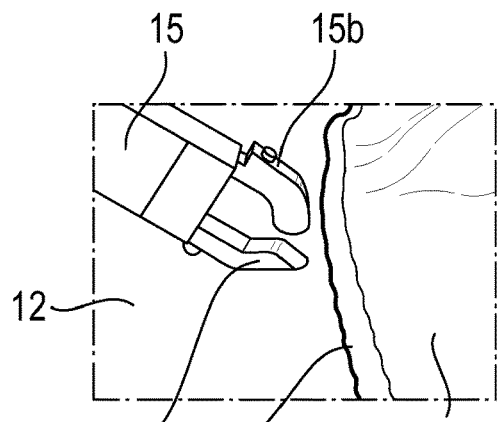
FIGS. 8 to 13 show detailed views of the positioning device according to the invention at different points in time while carrying out gripping operations of the method according to the invention.
Figure 9:
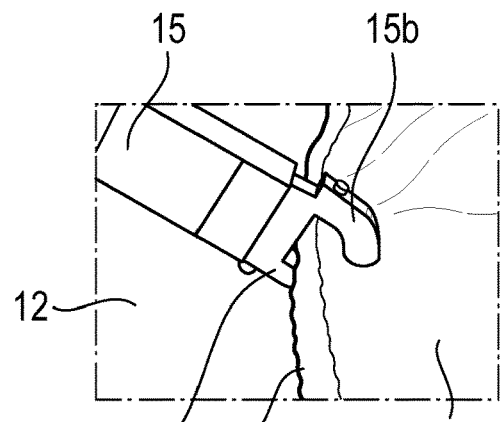
Figure 10:
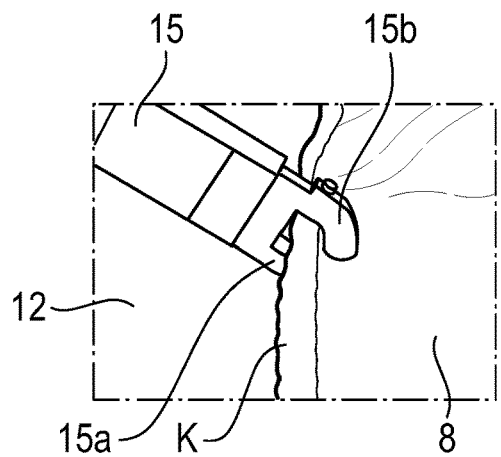

The approach to and gripping of the grippable edge K can be seen for the first gripper 15 in the sequence of FIGS. 8 to 10. For the second gripper 16 this is effected by way of analogy.

Proceeding from the gripped state, now the grippers 15, 16 are to be moved to opposite corners of the flat workpiece 8, which define the grippable edge K.

Figure 11:
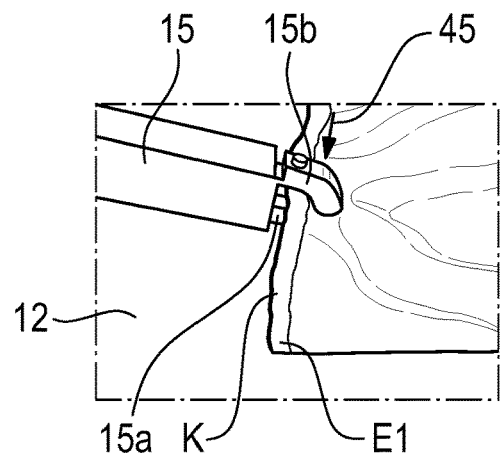
Figure 12:
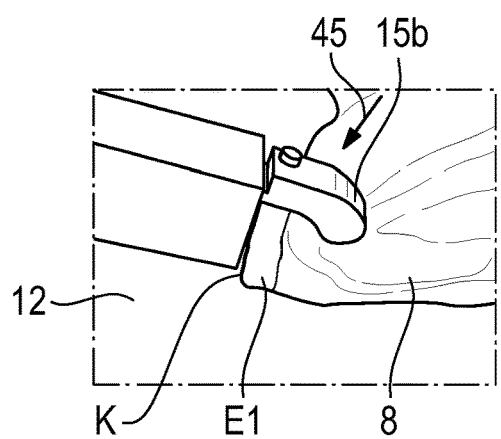
Figure 13:
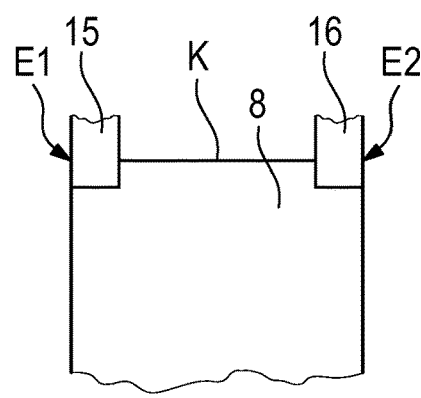

For this purpose, the flat workpiece 8 is first held by means of the second gripper 16, and the first gripper 15 is moved along the gripped edge K until the first gripper 15 grips a first corner E1 of the flat workpiece 8 (cf. arrow 45 in FIGS. 11 and 12).

In doing so, a gripping force of the first gripper 15 is reduced in comparison to the previous gripping and in comparison to the second gripper 16, so that the first gripper 15 can slide along the edge K without, however, letting go of the flat workpiece 8 (cf. FIGS. 10 to 12).

Subsequently, the second gripper 16 is moved, proceeding in the same way.

That is, the flat workpiece 8 is held by the first gripper 15, for which purpose its gripping force is increased to the original level again. At the same time, the second gripper 16 moves along the gripped edge K until it grips a second corner E2 of the flat workpiece 8.

To this end, a gripping force of the second gripper 16 is reduced in comparison with a gripping force of the first gripper 15 and in comparison with the previous gripping by means of the second gripper 16.

In order to facilitate the movement of the grippers 15, 16 along the edge, in the illustrated example the flat workpiece 8 is slightly lifted off the manipulation surface 12. Sliding along is thus performed a few centimeters above the manipulation surface 12.

In this connection, the corners E1, E2 may be detected by detecting an increased sliding resistance of the grippers 15, 16, which is possible in particular if the flat workpiece 8 is provided with a seam or border at its edges. Alternatively, the corners E1, E2 may be detected by means of a distance sensor. It is also possible to detect the corners E1, E2 in a camera-based manner or by means of acoustic vibration measurement.

After the first corner E1 has been gripped by means of the first gripper 15 and the second corner E2 has been gripped by means of the second gripper 16, the flat workpiece 8 can be deposited in a flat state on the feed surface 10 by means of both grippers 15, 16. The target state is thus attained.

Figure 14:
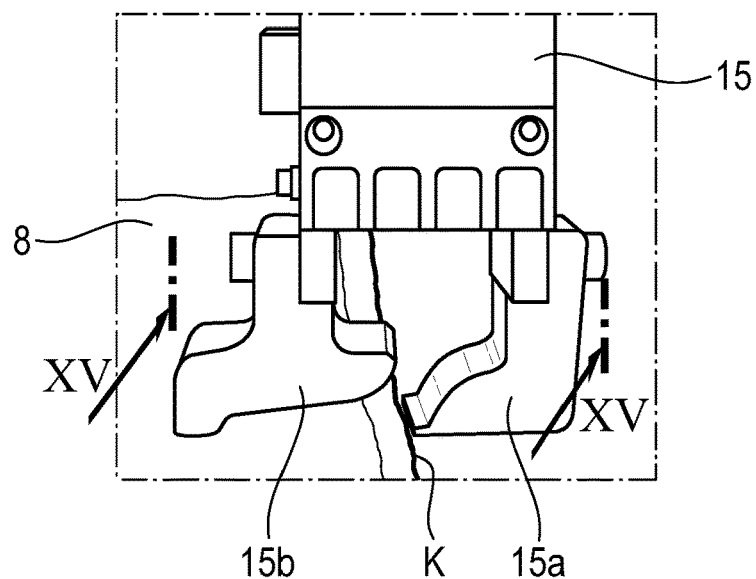
FIG. 14 shows an alternative embodiment of a gripper of a positioning device according to the invention.
Figure 15:
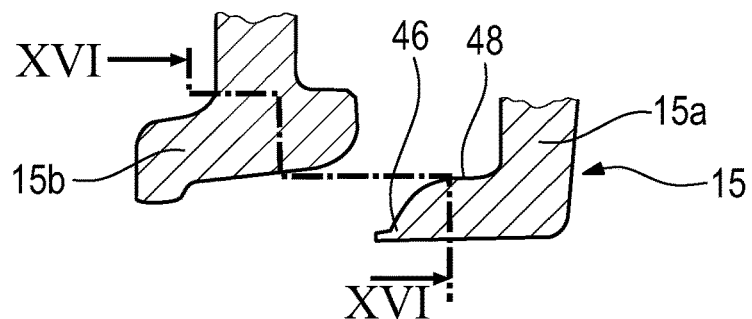
FIG. 15 shows the gripper of FIG. 14 in a sectional view along the plane XV-XV.
Figure 16:
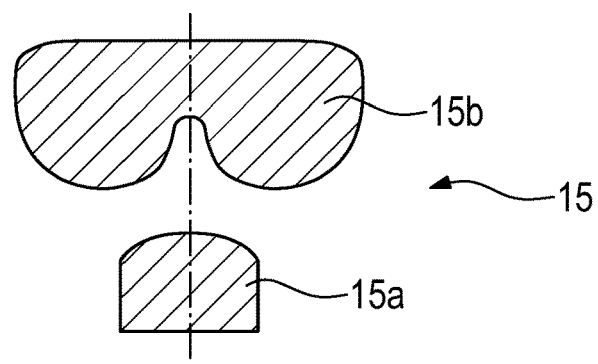
FIG. 16 shows the gripper of FIG. 15 in a sectional view along the plane XVI-XVI.

FIGS. 14 to 16 show an alternative embodiment of a gripper, which is illustrated using the example of the first gripper 15. The second gripper is designed in the same way.

This gripper also includes two fingers 15*a*, 15*b*. However, in the open state, these fingers are now arranged such that the grippable edge can be approached from above (see FIG. 14 in comparison to FIGS. 8 and 9).

To close the gripper, the lower finger 15*a* is now moved parallel to the manipulation surface 12 towards the upper finger 15*b*. In the process, it first moves with its tip 46 under the grippable edge K and in this way slightly lifts the flat workpiece 8.

The edge region of the flat workpiece 8 comprising the edge K is then pressed against the upper finger 15*b* by means of the curvature adjoining the tip 46. The curvature is designed to be so flat here that the edge K will not fold over as a result of being approached by means of the finger 15*a*.

As in the previous embodiment, the lower finger 15*a* is again provided with a single ball and the upper finger 15*b* with a double ball (see in particular FIG. 16). As an alternative, it is possible in this connection as well to fit the respective upper fingers with a single ball and the respective lower fingers with a double ball.

The invention claimed is:

1. A method of positioning a limp flat workpiece using a positioning device which includes at least one control unit, a camera, at least one first gripper and at least one second gripper, the method comprising the steps of:
   a) providing the flat workpiece in a random state on a manipulation surface;
   b) generating, by the camera, a camera image showing the flat workpiece;
   c) identifying, by a first machine learning module of the control unit, a grippable edge of the flat workpiece by extracting characteristic image features of the camera image;
   d) determining, by a second machine learning module of the control unit, a first gripping point for the first gripper at the grippable edge; and
   e) determining, by the second machine learning module of the control unit, a second gripping point for the second gripper at the grippable edge, the second gripping point being spaced apart from the first gripping point;

wherein the flat workpiece is held by the second gripper and the first gripper is moved along the gripped edge until the first gripper grips a first corner of the flat workpiece, and/or
   the flat workpiece is held by the first gripper and the second gripper is moved along the gripped edge until the second gripper grips a second corner of the flat workpiece, and
   wherein prior to generating the camera image, an area of contact of the flat workpiece with the manipulation surface is enlarged starting from a random state.

2. The method according to claim 1, wherein the flat workpiece is gripped in an automated manner by the first gripper and the second gripper, the first gripper gripping at the first gripping point and the second gripper gripping at the second gripping point.

3. The method according to claim 2, wherein the flat workpiece is deposited in a flat state by the first gripper and the second gripper.

4. The method according to claim 1, wherein for moving along with the first gripper, a gripping force of the first gripper is reduced in comparison to a gripping force of the second gripper, or the first gripper is opened by a specified amount.

5. The method according to claim 1, wherein for moving along with the second gripper, a gripping force of the second gripper is reduced in comparison to a gripping force of the first gripper, or the second gripper is opened by a specified amount.

6. The method according to claim 1, wherein prior to identifying the grippable edge, a type of the flat workpiece is identified by a third machine learning module of the control unit.

7. The method according to claim 6, wherein the third machine learning module includes a trained artificial neural network configured to receive the camera image or partial images of the camera image for extracting characteristic image features.

8. The method according to claim 1, wherein the first machine learning module includes a trained artificial neural network configured to receive the camera image or partial images of the camera image for extracting characteristic image features.

9. The method according to claim 1, wherein for identifying the grippable edge, the camera image is subdivided into a plurality of partial images, and characteristic image features are extracted by the first machine learning module of the control unit for each partial image and, based on the characteristic image features, for each partial image a probability is established with which it shows an edge of the flat workpiece.

10. The method according to claim 1, wherein the first gripping point and the second gripping point are determined in a section of the flat workpiece for the imaging of which in the camera image or in an associated partial image the relatively highest probability with which the camera image or the partial image shows an edge has been established by the first machine learning module.

11. The method according to claim 1, wherein the second machine learning module includes a trained artificial neural network which, for determining the first gripping point and the second gripping point, receives the camera image or at least one partial image of the camera image and extracts characteristic image features of the camera image or of the at least one partial image, wherein, based on the characteristic image features, gripping coordinates and a gripping orientation are calculated for the first gripper and/or gripping coordinates and a gripping orientation are calculated for the second gripper.

12. The method according to claim 1, wherein the flat workpiece is provided in a folded state on a manipulation surface in step a).

13. A method of positioning a limp flat workpiece using a positioning device which includes at least one control unit, a camera, at least one first gripper and at least one second gripper, the method comprising the steps of:
   a) providing the flat workpiece in a random state on a manipulation surface;
   b) generating, by the camera, a camera image showing the flat workpiece;
   c) identifying, by a first machine learning module of the control unit, a grippable edge of the flat workpiece by extracting characteristic image features of the camera image;
   d) determining, by a second machine learning module of the control unit, a first gripping point for the first gripper at the grippable edge; and
   e) determining, by the second machine learning module of the control unit, a second gripping point for the second gripper at the grippable edge, the second gripping point being spaced apart from the first gripping point,
   wherein prior to generating the camera image, an area of contact of the flat workpiece with the manipulation surface is enlarged starting from the random state.

14. A method of positioning a limp flat workpiece using a positioning device which includes at least one control unit, a camera, at least one first gripper and at least one second gripper, the method comprising the steps of:
   a) providing the flat workpiece in a random state on a manipulation surface;
   b) generating, by the camera, a camera image showing the flat workpiece;
   c) identifying, by a first machine learning module of the control unit, a grippable edge of the flat workpiece by extracting characteristic image features of the camera image;
   d) determining, by a second machine learning module of the control unit, a first gripping point for the first gripper at the grippable edge; and
   e) determining, by the second machine learning module of the control unit, a second gripping point for the second gripper at the grippable edge, the second gripping point being spaced apart from the first gripping point,
   wherein the first gripper and the second gripper grip the first and second gripping points respectively of the flat workpiece lying on the manipulation surface, and
   wherein prior to generating the camera image, an area of contact of the flat workpiece with the manipulation surface is enlarged starting from the random state.

15. The method according to claim 14, wherein the area of contact of the flat workpiece with the manipulation surface is enlarged by a ventilation unit comprising a plurality of outflow openings.

16. The method according to claim 14, wherein the flat workpiece is provided via a drop distance delimited by a ventilation unit comprising a plurality of outflow openings.

17. The method according to claim 14, wherein prior to identifying the grippable edge, a type of the flat workpiece is identified by a third machine learning module of the control unit.

18. The method according to claim 14, wherein for moving along with the first gripper, a gripping force of the first gripper is reduced in comparison to a gripping force of the second gripper, or wherein for moving along with the second gripper, a gripping force of the second gripper is reduced in comparison to a gripping force of the first gripper.

19. The method according to claim 14, wherein
   the flat workpiece is held by the second gripper and the first gripper is moved along the gripped edge until the first gripper grips a first corner of the flat workpiece, and/or
   the flat workpiece is held by the first gripper and the second gripper is moved along the gripped edge until the second gripper grips a second corner of the flat workpiece.

20. The method according to claim 14, wherein prior to generating the camera image, an area of contact of the flat workpiece with the manipulation surface is enlarged starting from the random state.

* * * * *